United States Patent [19]
Gfeller et al.

[11] Patent Number: 5,818,826
[45] Date of Patent: Oct. 6, 1998

[54] MEDIA ACCESS CONTROL PROTOCOLS IN A WIRELESS COMMUNICATION NETWORK SUPPORTING MULTIPLE TRANSMISSION RATES

[75] Inventors: Fritz Rudolf Gfeller, Rueschlikon, Switzerland; Peter Dirk Hortensius, Goldens Bridge, N.Y.; Patrick K. Kam, Pickering, Canada; Parviz Kermani, South Salem, N.Y.; Danny N. McKay, Toronto, Canada; Mahmoud Naghshineh, Fishkill, N.Y.; Claus Michael Olsen, Cortlandt Manor, N.Y.; Babak Rezvani, Port Chester, N.Y.

[73] Assignee: International Business Machines Corporation, Armonk, N.Y.

[21] Appl. No.: 664,718

[22] Filed: Jun. 17, 1996

[51] Int. Cl.⁶ .................................................. H04J 3/22
[52] U.S. Cl. ............................................ 370/342; 370/465
[58] Field of Search ..................................... 370/312, 320, 370/441, 442, 443, 465, 468, 342

[56] References Cited

U.S. PATENT DOCUMENTS

| | | | |
|---|---|---|---|
| 5,515,375 | 5/1996 | DeClerck | 370/468 |
| 5,568,483 | 10/1996 | Padovani et al. | 370/468 |
| 5,673,266 | 9/1997 | Li | 370/465 |
| 5,706,428 | 1/1998 | Boer et al. | 370/465 |

*Primary Examiner*—Min Jung
*Attorney, Agent, or Firm*—Douglas W. Cameron

[57] ABSTRACT

In a wireless multi-rate communications system, a method for extending the range of communications in the system by dividing the physical layer frame into two portions: a robust header portion and a body, where the repetition rate of the data symbols in the header portion is greater than or equal to the repetition rate of the data symbols in the body of the frame. In this way the header can be received and decoded by all stations in the system with a high probability, while the body of the frame need only be received and decoded by the destination station to which the body of the frame is intended to be received and decoded.

11 Claims, 2 Drawing Sheets

GENERAL FRAME FORMAT

RR AND RR* RATE SELECTION

5,818,826

MEDIA ACCESS CONTROL PROTOCOLS IN A WIRELESS COMMUNICATION NETWORK SUPPORTING MULTIPLE TRANSMISSION RATES

BACKGROUND OF THE INVENTION

1. Field of the Invention

This invention is in the field of wireless communication and multiple access protocols with their extensions in a communication environment where multiple rates (or modulation schemes) are used within the same shared wireless medium.

2. Background and Prior Art

In a wireless environment, the bit-error-rate depends on the received signal quality at any specific terminal and on the signal-to-noise ratio (SNR) at the receiver. In general, the SNR depends on the distance of the receiver from the transmitter, the transmitted power, and the environment itself (e.g. open space, characteristics of the geographical space and materials used in the environment). Assuming a fixed transmission power and a given environment, the SNR at any receiver depends on the distance from the transmitter as well as the level of interference (e.g. measured in terms of power) at the receiver. This interference can be generated by the environment (e.g. light sources in Infrared transmission) or by the signal transmitted by other terminals. In general, depending on the interference characteristics, modulation, coding, or signal processing techniques can be used to improve the SNR at a receiver [1]. For the Infrared wireless medium, a scheme based on repetition coding has been proposed in [2]. In this scheme, each symbol is transmitted n times (hence the term repetition coding) in the wireless channel. We refer to n as the repetition rate (R). The receiver in turn receives n symbols and makes a decoding decision. Now, as we increase n, the probability of receiving a symbol correctly increases and for a given bit-error-rate (BER) or signal-to-noise-ratio (SNR) at any receiver, one can find n in such a way that the probability of receiving a correct symbol is above a predefined level. As a result, the repetition rate R required to receive a symbol correctly with a predefined probability at a given receiver depends on the interference level at the receiver as well as its distance from the transmitter. Hence, since the SNR depends on the geographical placement and interference, the repetition rate necessary to achieve a given BER at a receiver is not fixed for all connections within a wireless network. Now let us consider the problem of accessing the shared medium using any distributed or coordinated protocol [3]. In general, if any wireless terminal using a media access control (MAC) protocol of choice needs to transmit signals for coordinating the access to the medium, such signals need to be heard by all terminals using that medium. We refer to any signal or symbols that bears information important to the MAC protocol, media coordination, or reservation as reservation or control signal or symbol (the control symbol can be sent from any wireless terminal in a distributed MAC and by a central coordination in a coordinated MAC). The collection of all reservation symbols in each frame convey the reservation information that is used to follow the MAC protocol rules and specifications.

There are another type of signals or symbols which we refer to as information or data symbols which are used for transferring information such as higher layer protocol data units from a transmitter to a specific receiver or a group of receivers (in case of multicast). These symbols do not bear any reservation or control meaning and hence do not need to be heard by all terminals using a shared wireless medium. Now, if reservation or control symbols are not heard by all terminals that use the shared medium, the MAC protocol rules will not be followed correctly by all stations and any station that does not receive the reservation signal might try to access the medium without being permitted. As a result, collisions may occur with a high probability and depending on the MAC protocol, the network throughput can degrade. In other words, the reservation reliability depends on the probability that all stations accessing a shared medium receive a reservation symbol and in turn the media throughput depends on the reservation reliability. Here one important issue in the design of the MAC protocol is the choice of the repetition rate R. Let us define $C(I,J)$ as the transmission rate from station I to station J, such that the received symbol error probability at I is less than a predefined level. For a given maximum transmission rate of Cmax with R=1 where each symbols is sent only once, $Cmax/C(I,J)$ defines the repetition rate $R(I,J)$ that a terminal I uses to transmit symbols to J. As for choosing the repetition rate $R(I,J)$, one can choose to transmit all symbols at the maximum repetition coding rate such that all station accessing the shared medium can hear all transmissions (reservation and data). But this will result in the lowest achievable throughput. The method described in this application provides schemes to overcome this issue and increase the throughput while maintaining the reservation reliability as in a scheme where all symbols within control (or reservation) frames and/or Data frames are sent with a repetition rate Rmax which is high enough that all terminals within the interference range can decode the symbols correctly with a high probability.

As an example, let us consider a random access protocol based on Request-to-Send (RTS) and Clear-to-Send (CTS) as described in [4]. In the light of the above discussion on multirate communication using repetition coding, RTS and CTS packets need to be sent with a repetition coding rate Rmax which enables all terminals that share the wireless medium to receive such control packets or frames with a predefined high probability. The problem in this case is that first of all, highly repetition coded RTS or CTS packets will increase their transmission time and hence the collision window of the MAC protocol and also reduce the throughput. In addition, when the channel is reserved for an extended time by doing a burst reservation, there is a need for other terminals that are not participating in the reservation to know that the channel is in use and to hold back any transmission. Note that even when the reservation is done with Rmax, there is a possibility that some station miss the reservation exchange. Again, in order to solve this problem, one could send all information with Rmax, but this will result in a very low throughput.

SUMMARY OF THE INVENTION

In this application, we define a scheme with similar reservation reliability as in the case where the full control packet or frame and/or data frames are sent with Rmax while achieving a higher throughput. A Media Access and contention resolution scheme for using multirate wireless communication is described. In such an environment, each physical layer frame is broken into two portions: (1) the robust header portion which contains all symbols important to the MAC protocol and media coordination and is sent with a repetition rate Rmax where Rmax is selected in such a way that all stations within the interference environment can decode the reservation symbols with a desired probability; and (2) data symbols which are sent with a repetition rate R where R can be less than Rmax. Here R depends on the channel conditions at any destination with respect to the source station transmitting such data symbols.

DETAILED DESCRIPTION OF THE PREFERRED EMBODIMENT

In order to provide a detailed description, we use a wireless medium where each transmitted symbol can be repetition coded, namely each symbol is repeated multiple times at the modulation level in order to increase the probability of the correct reception of that symbol depending on the interference. A prime example for this would be the case where Infrared (IR) is used as the wireless communication medium (see |2|). Since the repetition of each symbol results in a reduction of the throughput, increasing link quality results in extending the packet transmission time and reducing the link speed. Now, in light of the above description, symbols that carry control information and have to be heard by all stations are transmitted with highest repetition rate so that they are correctly received by all stations. On the other hand the repetition rate of data symbols is selected using a rate selection algorithm described below such that the data is received correctly with a high probability at destination station(s). In the current application the terms "repetition rate" and "coding rates" are used interchangeably and are used to refer to coding rates as understood in the art.

Underlying Transmission and Media Access Scheme

In this section we consider a wireless system with the following characteristics in order to provide a detailed description of the preferred embodiment. Note that the general scheme, methodologies and algorithms presented here can be used in many different wireless link modulation and media access schemes and are not limited to the following environment specifications.

Figure 1:
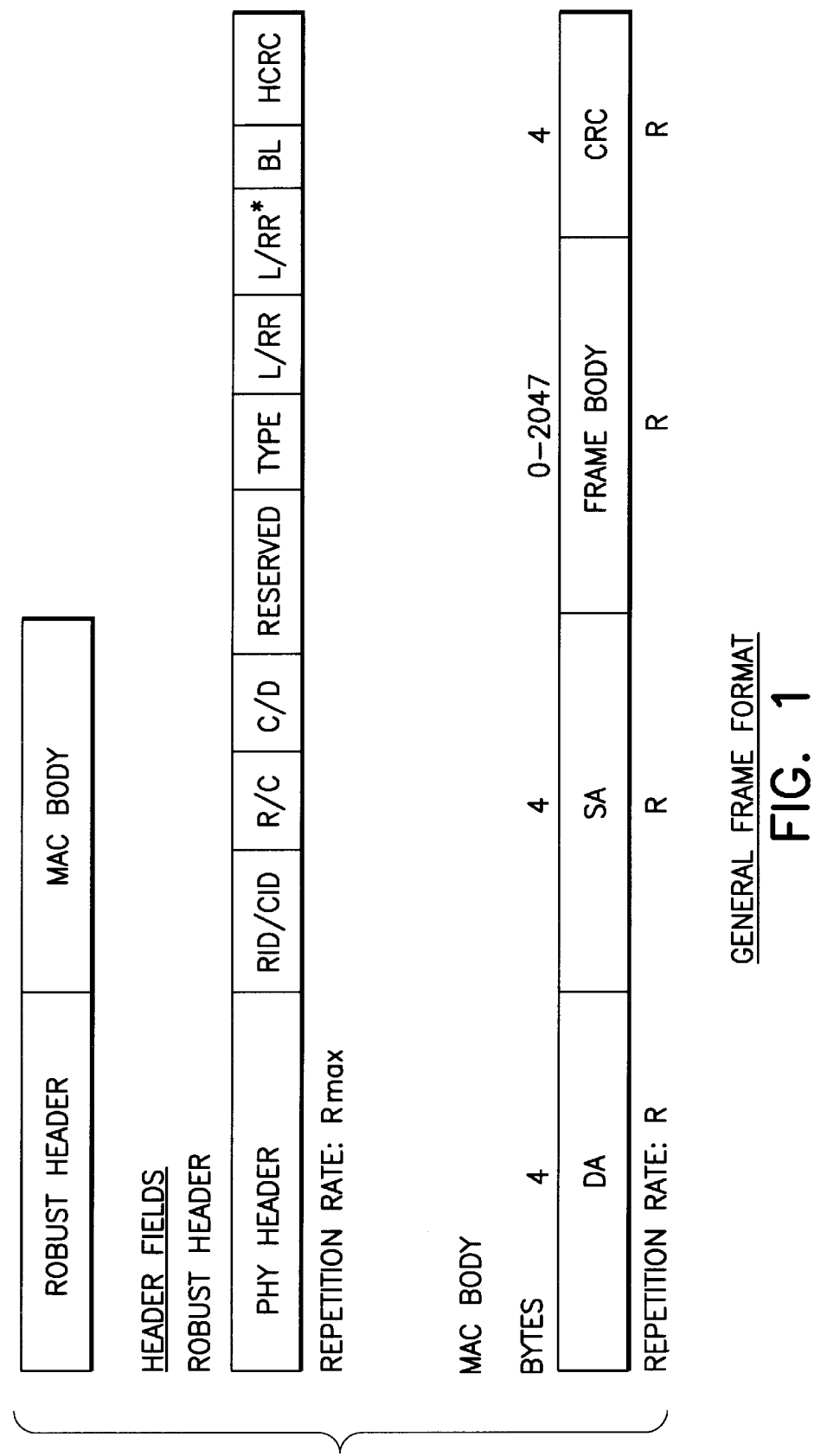
FIG. 1 is a general frame format for control packets and data packets.

1- Packet transmission or access a scheme whereby two types of packets are defined in general, (a) Control Packets, (b) Data Packets. See FIG. 1.
2- Each physical layer frame consists of a robust header and a MAC body as shown in FIG. 1 where the header is repetition coded with a fixed rate denoted by Rmax (e.g. 16 times) so that all stations within the interference range of any transmitter can receive and decode the header with a high probability. The body of the frame is repetition coded to the extent that the destination(s) of that transmission can receive and decode the information presented in the frame body. This rate is denoted by R. Thus the repetition coding rate of the body varies depending on the interference at a receiver and channel conditions between any source/destination pair.
3- A random access scheme with collision avoidance based on MACAW |4| is used to access a shared wireless medium. Each data transmission from a source station (A) to a destination station (B) can follow by sending an ACK packet from B to A. The medium can be reserved by a reservation exchange between A and B (e.g. an RTS-CTS exchange) and then one or more data packets can be exchanged between A and B. The length of time that the media is reserved can be announced by A and B in their reservation handshake or it can be terminated by exchanging disconnect messages at the end of the data transmission.

Reliable Media Access Reservation and Signaling Scheme I

In this scheme, the repetition rate R for the body of control frames is less than or equal to Rmax. That is the body of control frames are transmitted with a repetition rate so that their destination can receive and decode the body with a high probability. The header is always repetition coded with Rmax so that all stations within the interference range of a transmitter can receive and decode it with a high probability. This scheme is designed to increase the throughput and reduce the collision window on the transmission of reservation control frames (e.g. RTS/CTS) since if MAC bodies were transmitted with the repetition code of Rmax they will have a potentially much longer transmission time and hence a larger collision window. All fields of any frame (reservation frames or data frames) that bear any reservation specific information are repetition coded with Rmax and are in the frame header. The following fields are defined in the header in addition to any preamble (or any other fields) required by the physical layer. We assume that source and destination addresses are within the frame body and are sent with the repetition rate R.

1- Reservation Identification (RID) This field identifies an ID associated with an ongoing reservation attempt or data exchange. Since RID is in the robust header, it is heard with a high probability by all stations with which the transmitting station can interfere. As a result, even if the source or destination address fields of a reservation exchange control frame, or a data frame are not correctly decoded by a station C that has a noisy channel to the transmitter A, station C can make appropriate decisions on the status of the shared medium (that is if there is a reservation attempt pending, or if there is a data exchange taking place). By knowing this information, station C can take an appropriate action in order to avoid interfering with an existing reservation. Conversely, a receiving station (B) would know that a previous reservation attempt was destined to B although the MAC body was not correctly received and after a new reservation attempt, it knows to respond to that reservation if no other reservation is pending. In the above description, RID is defined per reservation in a static or a random manner. That is a station that starts a reservation, can have a predefined RID defined uniquely for each destination station, or it can select a random RID for the full duration of each reservation attempt and data exchange. Another alternative use of the RID is to define it for a group of stations. In this case all stations with the same RID would have a common repetition rate R which enables them all to receive and decode the transmission of any member of the group. Any station that receives a data or control frame with an RID assigned to a group different from the one (or ones) assigned to that station, would ignore the transmission. In other words, any station tries to lock into signals transmitted at the physical layer by stations belonging to its own group (or groups)

2- Frame Type This field defines the type of the frame. Firstly, it defines if the frame is a data frame or a control frame. Secondly, it defines the sub-types of frames within each defined type. For data frames the following types are defined: (1) Reserved Data Frames which are frames that are sent using a reservation exchange (2) unreserved data frames which are frames transmitted without going through the full reservation exchange. For Control frames, at least following frame types are defined: Request-to-Send (RTS), Clear-to-Send (CTS), End-of-Burst (EOB), End-of-Burst-Confirmed (EOBC), ACK, and NAK.

3- Reservation Time This field defines the amount of time that a medium is being reserved for in control frames and the amount of time left to the end of reservation period when data frames are sent within the reservation time.

An example of the scheme with the usage of the above-mentioned fields is provided in the following. We assume that there are two stations that are participating in a reservation called A and B, and there is a station called C that is an observer of the reservation. We assume that the MAC rules defined in |4| are used and we specify only the cases which are related to the repetition coding of frames headers. The header of control and data frames are shown in FIG. (1). In Table (1), we have defined all fields in these frames and the associated repetition rate of each field. It is important to note the Cyclic Redundancy Check (CRC) of each frame is based on the data in the portion of the frame called the MAC body which includes the source and destination address of the frame as well as the higher layer protocols data units. Regarding the repetition rates for our specific example, we denote the repetition rate required to receive data symbols (or information symbols) from A by B so that their error probability is less than a desired value (denoted by P) by $Ra\_b$ and similarly the repetition rate of data symbols sent from B to A is denoted by $Rb\_a$. Here, $Ra\_b$ and $Rb\_a$ are selected based on packet exchanges between stations A and B and based on the error calculations, the rate is selected. In the following, we describe the MAC rules which are specific to the subject of this invention and are defined in addition to the MACA rules defined in |4| in order to exemplify the usage of the maximum repetition rate transmission for reservation symbols and lower repetition rate transmission for data symbols. It is important to note that when MAC body is correctly received by any station the normal MAC rules as specified in |4| are followed and what we describe is only for conditions where the MAC frame is in error but the Type and RID fields of the robust header are received correctly. In this scheme, when station A starts a reservation attempt to B, it selects a RID which can be pre-assigned to A for its communication with B, or it can be randomly selected for that single reservation attempt. Once such an RID is selected, it is kept unchanged throughout the reservation attempt. This is done until the reservation is successful and data frame transmission takes place whereby data and ACK frames also use the same RID, or until another reservation attempt between some other stations forces A to go into the quiet state.

1. When B receives an RTS frame from A where the type of the frame (RTS) is defined based on the type field of the robust header and the MAC body is in error (i.e. it has a bad CRC), then Station B records the RID of the said frame and stays quiet for a period of time T1. This time (T1) is selected such that a CTS can be sent within that time in reply to an RTS.
2. When A received a CTS frame, with the same RID as A had used for its most recent RTS frame and A is in the wait-for-CTS state, then A assumes that the reservation has been successful. This is done even when the MAC body portion of the received CTS frame is in error.
3. When B receives a RTS frame with the same RID as received in a previous frame and there has been no other RTS or CTS frames with different RIDs transmitted between the said RTS frames, and the MAC body of the first RTS frame is received incorrectly and the destination address of the second RTS frame is B and received correctly, then B assumes that A is attempting a reservation with B, and replies with a CTS to A using the same RID as used by A in its RTS frame to sent B.
4. When C receives a CTS frame from B, then it records the RID of the frame and goes into Quiet state for time T2. This is done even if the MAC frame portion of the CTS frame is in error. Here T2 can be the time required to hear an ACK with the same RID, or it can be also chosen so that A can send all its data to B within the intended reservation time announced in Reservation Time of the header.
5. When C receives a Data frame from A, or an ACK frame from B bearing the same RID as the one previously heard in a reservation attempt (and RTS or CTS), then C stays quiet for a defined time in the reservation time field of the frame. If the reservation time field is not used, then C stays quiet for a predefined time or until the end of data transmission between A and B is announced to be terminated by sending EOB and EOBC frames.
6. When B receives a Data frame from A and the MAC body of that frame is in error, then B sends a Negative Ack (NACK) to A, if the data frame bears a RID which is the same as the one used for the most recent reservation exchange (RTS/CTS exchange) with A, and the medium is still reserved for A and B's transmission.
7. When C hears a Data or ACK frame and the RID of the said frame is different from the RID of any ongoing reservation that C knows about, then C stays quiet until the said reservation is completed. The decision as to the completion of a data transmission is made based on observing the reservation time field or based on a EOB/EOBC exchange.

Scheme 2

In this, Control frames are repetition coded with Rmax (header and body). Since all control frame are repetition coded with Rmax, the Source and destination addresses are used to identify stations that are reserving a medium and to keep track of the reservation state. In this scheme the type and reservation time fields can be in the header of the data frames and are used to follow the MAC protocol rules.

Rate Selection Algorithm

In this section, we describe a rate selection algorithm to be used in the environment described in the above. Here Rmax is defined in such a way that all terminals using the same shared medium can receive each others reservation symbols. This can be done by broadcasting test frames which bear the source address of the transmitting station and including the lowest rate or highest repetition rate that the transmitting station needs to decode symbols from other stations in the same broadcast frame. Here, each station that receives a broadcast frame, makes a rate selection decision based on counting errors (or signal quality or SNR) and then if the rate is smaller than what has been know in the network it broadcasts the new rate in the medium. In this way, the lowest required in the medium if found and by assigning one station as the central coordinator, the new Rmax is made known in the network and every terminal sets its Rmax. Another way is to make Rmax fix and define it at the initialization time.

Figure 2:
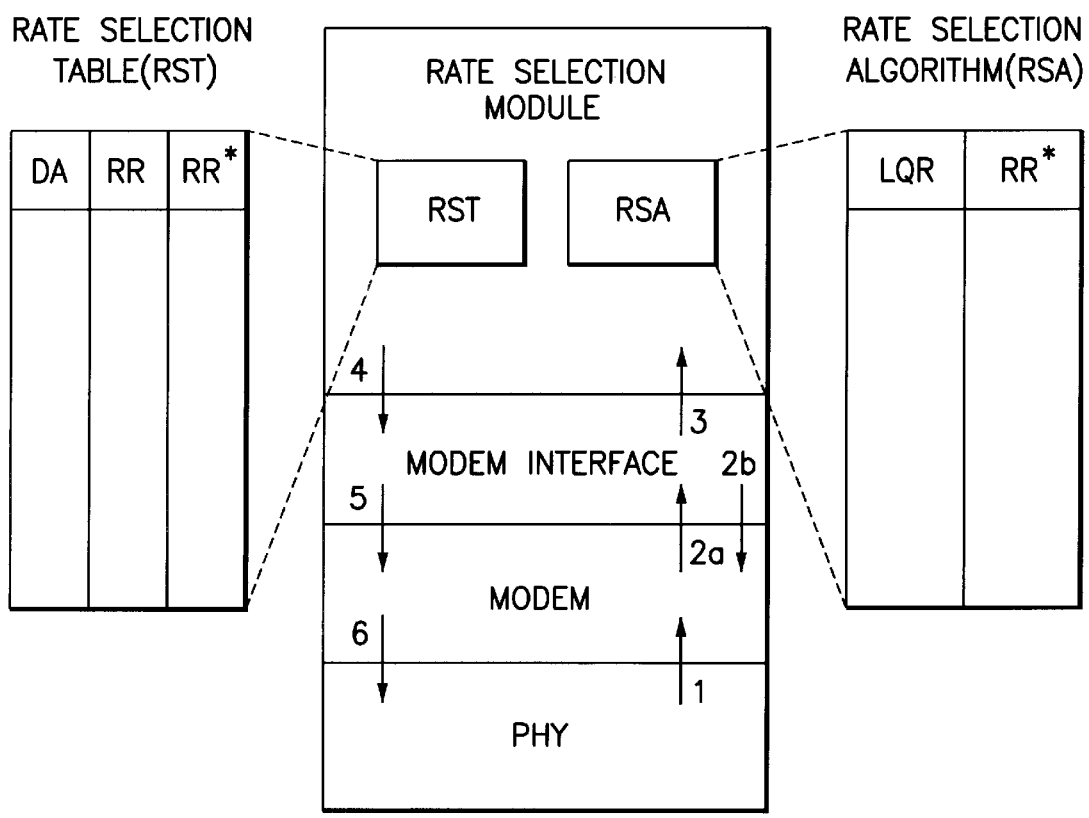
FIG. 2 is a block diagram showing the rate selection module.

Referring to FIG. 2, we proceed to describe how RR and RR* are selected for transmission of data symbols between two stations. Here RR is the repetition rate of the frame being transmitted and RR* is the repetition rate that the receiver is recommended to use to send frames to the transmitter.

Initialization

The RR and RR* of a station address which does not have a corresponding entry in the Rate Selection Table (RST) in FIG. 2 are set to maximum value of repetition coding Table Maintenance The table can have a fixed number of entries, where old entries are cached out based on an aging timer Rate Selection Process 1) A frame is received from the PHY layer 2a) The errors are counted and based on that the link quality parameter (LQP) is calculated passed to the rate selection module 2b) If an immediate response to the frame is required then {the RR* of the frame is used for the response rate;}

3) else if the frame is passed to rate selection module then {the LQP is passes along the frame to the rate selection module RR* indicated in the frame is used for the repetition rate RR to the transmitting station and is saved in the Rate selection Table (RST) shown in FIG. 2.

Based on the LQP, response rate RR* for sending frames from the transmitting station to the receiving station is selected using the Rate selection Algorithm (RSA) and saved in RST which is shown in FIG. 2.}

4) A frame is passed to the PHY layer with the RR* and RR set based on the destination address which is read from the RST 5) The frame is passed to the PHY layer and transmitted where RR is used for the repetition rate 6) The frame is transmitted on the PHY Medium References

[1] J. Proakis and M. Salehi, "*Communications Systems Engineering*", Prentice Hall, 1994

[2] F. Gfeller, W. Hirt, M. de Lange, and Beat Weiss, "*Wireless Infrared Transmission: How to reach All Office Space*", Proceedings of IEEE VTC, Atlanta, 4/1996

[3] M. Schwartz, "*Telecommunications Networks: Protocols, Modeling, and Analysis*", 1987

[4] V. Bhargavan, A. Demers, S. Shenker, L. Zhang, "*MACAW: A Media Access Protocol for Wireless LANs*" Proceeding of SIGCOMM 94, London, England, 8/94.

TABLE 1

| Field | Value | Description |
|---|---|---|
| R/C = 1 | | Next field represent Reservation ID (RID) to be used by the controller and the MAC protocol |
| R/C = 0 | | Next field represents Cluster ID (CID) to be used by the modem for small size cells and throughput gain |
| RR | | Repetition Rate (R) from transmitter to the transmitter to the receiver |
| L | | 0 = 4 PPM data (1 = 16 PPM) |
| C/D = 1 | | Header of a control frame - This indicates to the modem that the length of the is given and fixed, in this case, BL defines the Burst Length (in msec) when the frame type is an RTS or CTS |
| C/D = 0 | | Header of a data frame - This indicates the length of MAC body the is given by BL (Block Length) |
| BL | | Burst Length in msec if C/D = 1 Block Length in Bytes if C/D = 0 |
| Type | | RTS, CTS, EOB, EOBC, ACK, NACK, unreserved data, reserved data, etc. |
| Reser-ved | | Reserved for future compatibility, versions, PHY |

TABLE 1-continued

| Field | Value | Description |
|---|---|---|
| | | header extentions, power control, etc. |
| RR* | | Repetition rate expected from the receiver to the transmitter |
| HCRC | | Robust Header CRC |

What we claim is:

1. In a wireless multi-rate communications network having a plurality of stations, a method of increasing a transmission range of said network, said method comprising:
transmitting frames, at least one of said frames having a header and a body, said body indicating a source address and a destination address, said header being transmitted at a first repetition rate, said body being transmitted at a second repetition rate less than said first repetition rate, where said second repetition rate is used for data transmission between a source and destination indicated by said source address and said destination address respectively.

2. A method as recited in claim 1, wherein said header comprises a type field indicating a type of frame being transmitted.

3. A method as recited in claim 2, wherein said header further comprises a reservation identification field identifying a pair of said stations communicating.

4. A method as recited in claim 3, wherein said header further comprises a reservation time field indicating a time period during which a station with said reservation identification can access said network.

5. In a wireless multi-rate communications network, having a plurality of stations, a method of increasing a transmission range of said network, said method comprising:
transmitting control frames for media access coordination, each control frame having at least a type field, said type field being sent at a first repetition rate lower than or equal to a predefined threshold, said type field in said control frame indicating a type of control frame being transmitted;
transmitting data frames, each data frame having a header and a body, said header being transmitted at said first repetition rate, and said body being transmitted at a second repetition rate less than said first repetition rate; and
when receiving a first of said control frames by a first of said stations if said first control frame has a type field indicating a reservation attempt, transmitting a reservation confirmation in a type field of a second control frame from a second of said stations receiving said first control frame, where all other of said stations remain silent during transmission of said data frames by said first station.

6. A method as recited in claim 5, wherein said header further comprises a reservation identification field identifying a pair of said stations communicating.

7. A method as recited in claim 6, wherein said header further comprises a reservation time field indicating a time period during which a station with said reservation identification can access said network.

8. In a wireless multi-rate communications network having a plurality of stations, a method of increasing transmission range when using a reservation protocol, said method comprising:
transmitting physical layer symbols within any physical layer frame, said symbols bearing information related to the media access protocol and coordination at a first repetition rate, said first repetition rate being lower than a threshold, and all other symbols within said physical layer frame being transmitted at a second repetition rate less than said first rate, where said first repetition rate is used to extend said transmission range and said second repetition rate is used to increase throughput between a station transmitting said frame and a station receiving said frame.

9. In a wireless multi-rate communications network having a plurality of stations, a method of increasing a transmission range when using a reservation protocol, said method comprising:

transmitting physical layer symbols within any physical layer frame at a first repetition rate, said symbols bearing information related to said reservation protocol, said first repetition rate being lower than or equal to a threshold, and all other symbols within said physical layer frame being transmitted at a second repetition rate less than said first repetition rate, where said first repetition rate is used to extend said a transmission range and said second repetition rate is used to increase throughput between a station transmitting said frame and a group of stations receiving said frame, said second repetition rate being selected based on a station lowest repetition rate required for said transmitting station to communicate with all of said stations within said group.

10. In a wireless multi-rate communications network having a plurality of stations, a method of increasing transmission range of frames transmitted in said network, said method comprising:

a. transmitting a header of each of a number of said frames at a first repetition rate; and b. transmitting an information field of each of said number of frames at a second repetition rate less than said first repetition rate, wherein said second repetition rate varies for each frame depending upon the noise detected by a receiving station indicated by a destination address in each frame.

11. In a wireless multi-rate communications network having a plurality of stations, a method of increasing communication range and reducing collisions due to hidden terminals when using a collision avoidance reservation protocol, said method comprising:

transmitting frames, each frame having a header and a body, said body indicating a source and destination address of each corresponding frame, said header being transmitted at a first repetition rate, said body being transmitted at a second repetition, rate less than said first repetition rate, where said first repetition rate is used to extend communication distance and reduce collisions, and where said second repetition rate is used to increase throughput between a source and destination indicated by said source address and said destination address respectively.

* * * * *